United States Patent
Wada

(10) Patent No.: US 9,146,781 B2
(45) Date of Patent: Sep. 29, 2015

(54) WEB SERVICE SYSTEM, SERVER MANAGEMENT APPARATUS, AND WEB SERVICE PROVIDING METHOD

(75) Inventor: Katsuhiro Wada, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 292 days.

(21) Appl. No.: 13/362,738

(22) Filed: Jan. 31, 2012

(65) Prior Publication Data
US 2012/0215910 A1 Aug. 23, 2012

(30) Foreign Application Priority Data
Feb. 18, 2011 (JP) ................................ 2011-032814

(51) Int. Cl.
| G06F 9/50 | (2006.01) |
| G06F 3/12 | (2006.01) |
| H04L 12/24 | (2006.01) |
| H04L 29/08 | (2006.01) |

(52) U.S. Cl.
CPC ............ *G06F 9/5011* (2013.01); *G06F 3/1204* (2013.01); *G06F 3/126* (2013.01); *G06F 3/1288* (2013.01); *H04L 67/1021* (2013.01); *H04L 41/0273* (2013.01); *H04L 67/02* (2013.01); *H04L 67/18* (2013.01)

(58) Field of Classification Search
CPC ..... G06F 3/1204; G06F 3/126; G06F 3/1288; G06F 9/5011; H04L 41/0273; H04L 67/02; H04L 67/1201; H04L 67/18
USPC ........................................................ 358/1.15
See application file for complete search history.

(56) References Cited

U.S. PATENT DOCUMENTS

| 6,369,907 B1* | 4/2002 | Aoki ............................ 358/1.15 |
| 6,452,692 B1* | 9/2002 | Yacoub ......................... 358/1.15 |
| 6,920,506 B2* | 7/2005 | Barnard et al. ............... 709/245 |
| 7,336,381 B2* | 2/2008 | Nakajima .................... 358/1.15 |
| 7,778,495 B2* | 8/2010 | Aoki et al. .................... 382/307 |
| 7,839,521 B2* | 11/2010 | Bard et al. .................... 358/1.15 |
| 7,970,817 B2* | 6/2011 | Hagiuda et al. .............. 709/203 |
| 8,237,961 B2* | 8/2012 | Sakai ........................... 358/1.15 |
| 8,526,037 B2* | 9/2013 | Emori et al. ................. 358/1.15 |
| 2002/0060809 A1* | 5/2002 | Aoki ............................ 358/1.15 |
| 2004/0194010 A1* | 9/2004 | Kirihara et al. .............. 715/500 |

(Continued)

FOREIGN PATENT DOCUMENTS

| JP | 2001-273225 A | 10/2001 |
| JP | 2002-091843 A | 3/2002 |
| JP | 2010-9218 A | 1/2010 |

OTHER PUBLICATIONS

Japanese Office Action issued in corresponding application No. 2011-032814 on Oct. 7, 2014.

*Primary Examiner* — Joe Chacko
(74) *Attorney, Agent, or Firm* — Carter, DeLuca, Farrell & Schmidt, LLP

(57) ABSTRACT

A virtual device management server manages location information and resource information about a virtual device server as server information. The virtual device management server receives a processing request and printer location information from a printer. Then, the virtual device management server selects a virtual device server for providing a Web service corresponding to the processing request on the basis of server information, the processing request, and location information about the printer to thereby assign the selected virtual device server to the printer.

7 Claims, 11 Drawing Sheets

(56) References Cited

U.S. PATENT DOCUMENTS

| | | | |
|---|---|---|---|
| 2005/0257126 A1* | 11/2005 | Hagiuda et al. | 715/500 |
| 2006/0126110 A1* | 6/2006 | Ohara et al. | 358/1.15 |
| 2008/0282333 A1* | 11/2008 | Teramoto et al. | 726/8 |
| 2009/0051962 A1* | 2/2009 | Asai et al. | 358/1.15 |
| 2009/0094604 A1* | 4/2009 | Sakai | 718/1 |
| 2009/0296133 A1* | 12/2009 | Kawabushi et al. | 358/1.15 |
| 2010/0230493 A1* | 9/2010 | Akiyama | 235/437 |
| 2011/0043853 A1* | 2/2011 | Omori | 358/1.15 |
| 2011/0157632 A1* | 6/2011 | Tsutsumi | 358/1.15 |
| 2011/0261407 A1* | 10/2011 | Kikuchi | 358/1.15 |
| 2012/0311311 A1* | 12/2012 | Asahara | 713/1 |

* cited by examiner

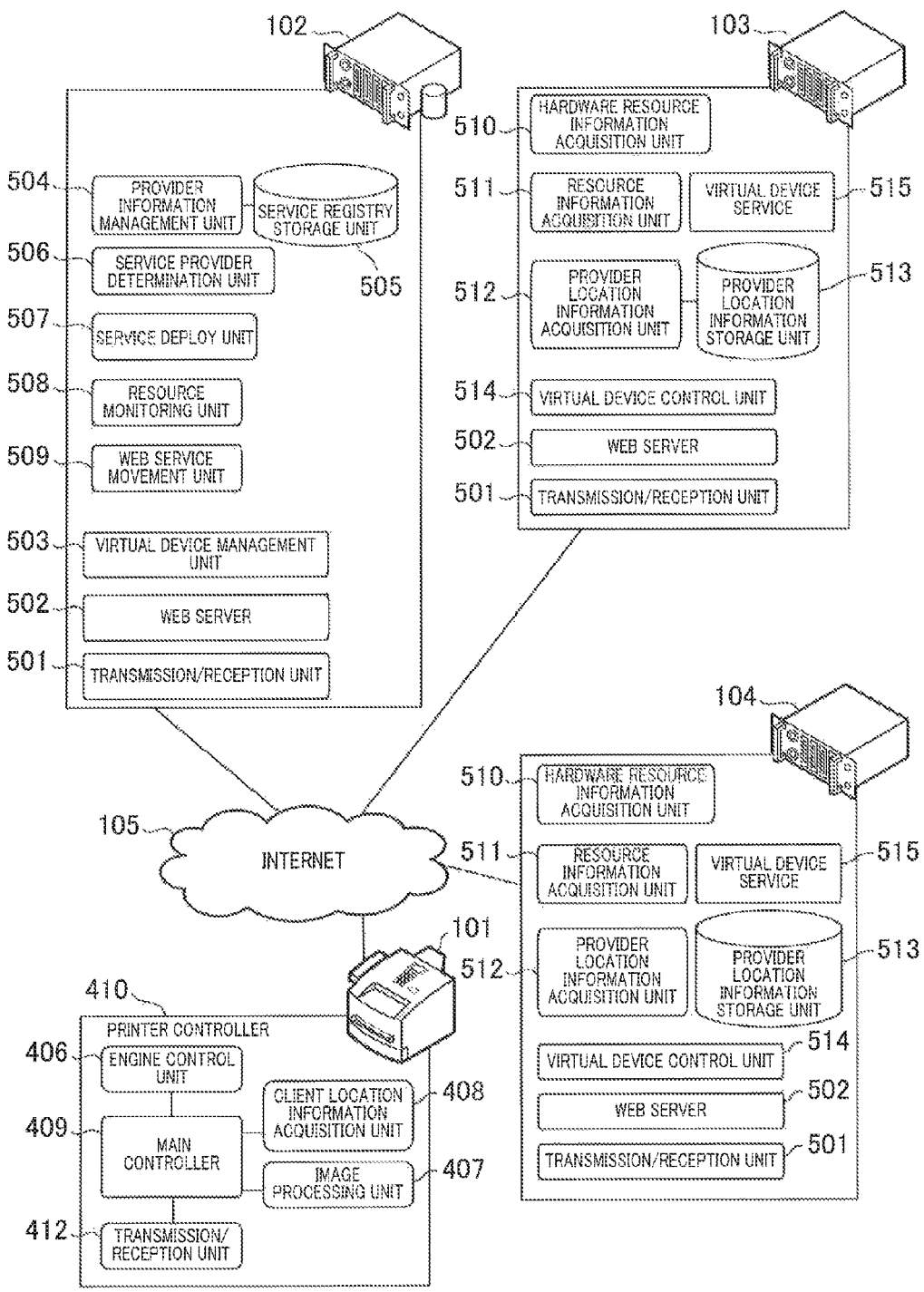

FIG. 5A

| Identifier | Network ||||  Location (Physical location information) ||||
|---|---|---|---|---|---|---|---|---|
| | Address | Domain | Service bus | Region | Installation location | Longitude | Latitude | TimeZone |
| MFP001 | 10.0.0.1:5000 | print.ddd.co.jp | ServiceBus001 | JP | Tokyo01 | E139.46.13.6 | N35.40.39.6 | +9 |
| SFP001 | 10.0.0.2:6000 | print.ddd.co.jp | ServiceBus001 | JP | Tokyo01 | E139.46.13.6 | N35.40.39.6 | +9 |
| MFP002 | 10.0.0.2:5000 | print.ddd.co.jp | ServiceBus001 | JP | Tokyo01 | E139.46.13.6 | N35.40.39.6 | +9 |
| SFP002 | 10.1.0.2:7000 | print.ddd.com | ServiceBus002 | US | LA01 | E139.46.13.6 | N35.40.39.6 | −16 |
| MFP003 | 10.1.0.2:5001 | print.ddd.com | ServiceBus002 | US | LS01 | E139.46.13.6 | N35.40.39.6 | −16 |

FIG. 5B

| Service identification | Service identification | Relative location information |||
|---|---|---|---|---|
| Printer | | Number of hops | Communication delay | Time difference |
| MFP001 | Print001 | 1 | 100ms | 0 |
| MFP001 | Scan001 | 2 | 500ms | 0 |
| MFP001 | Print002 | 2 | 500ms | 0 |
| MFP001 | Fax001 | 2 | 500ms | 7 |
| MFP001 | Print003 | 2 | 500ms | 7 |

FIG. 5C

| Identifier | Web service | | | End point | Binding | | Network | | | Location (Physical location information) | | | | | | |
|---|---|---|---|---|---|---|---|---|---|---|---|---|---|---|---|---|
| | Name | Version | URL | | Binding Type | Address | Domain | Service bus | Region | Data center | AP | Virtual PC | Physical PC | Longitude | Latitude | TZ |
| Print001 | PrintService | 10.10 | print001.ws.ddd.co.jp | | HTTPS | 10.0.0.1:5000 | WS.ddd.co.jp | ServiceBus001 | JP | Tokyo01 | L100 | VM001 | Server001 | E139.46.13.6 | N35.40.39.6 | +9 |
| Scan001 | ScanService | 1.00 | scan001.ws.ddd.co.jp | | HTTPS | 10.0.0.2:6000 | WS.ddd.co.jp | ServiceBus001 | JP | Tokyo01 | L200 | VM002 | Server001 | E139.46.13.6 | N35.40.39.6 | +9 |
| Print002 | PrintService | 9.02 | print002.ws.ddd.co.jp | | HTTPS | 10.0.0.2:5000 | WS.ddd.co.jp | ServiceBus001 | JP | Tokyo01 | L200 | VM002 | Server001 | E139.46.13.6 | N35.40.39.6 | +9 |
| Fax001 | FaxService | 1.00 | fax001.ws.ddd.co.jp | | HTTPS | 10.1.0.2:7000 | WS.ddd.co.jp | ServiceBus002 | US | LA01 | L300 | VM001 | Server101 | W118.24.27.8 | N34.05.22.20 | −16 |
| Print003 | PrintService | 10.10 | print003.ws.ddd.co.jp | | HTTPS | 10.1.0.2:5001 | WS.ddd.co.jp | ServiceBus002 | US | LA01 | L300 | VM001 | Server101 | W118.24.27.8 | N34.05.22.20 | −16 |

FIG. 5D

| Identifier | Physical PC | | | Host OS | | | Guest OS1 (Web service 1) | | | Guest OS2 (Web service 2) | | |
|---|---|---|---|---|---|---|---|---|---|---|---|---|
| | CPU usage rate | Network card usage rate | Disk I/O | CPU usage rate | Network card usage rate | Disk I/O | CPU usage rate | Network card usage rate | Disk I/O | CPU usage rate | Network card usage rate | Disk I/O |
| Print001 | 22.04% | 65.89% | 20.41% | 60.11% | 90.50% | 13.66% | 70.22% | 10.61% | 84.95% | 84.13% | 38.34% | 54.84% |
| Scan001 | 1.63% | 61.46% | 69.37% | 76.18% | 65.24% | 22.17% | 0.54% | 55.23% | 11.38% | 51.20% | 55.12% | 77.09% |
| Print002 | 35.86% | 7.51% | 64.96% | 0.11% | 13.43% | 3.25% | 82.63% | 70.03% | 81.90% | 91.59% | 84.68% | 7.84% |
| Fax001 | 33.61% | 30.21% | 54.85% | 77.67% | 83.40% | 32.95% | 81.59% | 64.80% | 18.91% | 66.18% | 93.63% | 53.03% |
| Print003 | 4.54% | 1.22% | 6.33% | 7.45% | 0.44% | 1.00% | 1.23% | 1.98% | 2.23% | 0.02% | 0.65% | 2.00% |

WEB SERVICE SYSTEM, SERVER MANAGEMENT APPARATUS, AND WEB SERVICE PROVIDING METHOD

BACKGROUND OF THE INVENTION

1. Field of the Invention

The present invention relates to a Web service system, a server management apparatus, and a Web service providing method.

2. Description of the Related Art

Service creation methods that bring a plurality of Web services into association with a service bus have been proposed. Japanese Patent Laid-Open No. 2010-9218 discloses a service bus association method that can utilize a Web service on the adjacent service bus through registration of node identifiers and location information for service buses.

However, if the service bus association method disclosed in Japanese Patent Laid-Open No. 2010-9218 is applied to a Web service system including an image forming apparatus, a server that provides a Web service corresponding to processing requested from the image forming apparatus, and a server management apparatus that manages the server, the following problems may arise. Depending on the application of the service bus association method, it is difficult for the server management apparatus to select as Web service, which corresponds to the location of the image forming apparatus and the processing content requested by the image forming apparatus, among a plurality of Web services and to provide the selected Web service to the image forming apparatus.

For example, a description will be given of the aforementioned difficulty using an example as follows. Assume the case where as server management apparatus that operates on a cloud manages a virtual printer as a server and a virtual device installed on the server provides a Web service corresponding to processing requested from an image forming apparatus. The virtual device functions as a processing execution unit that executes processing corresponding to a Web service.

When the server management apparatus assigns an image forming apparatus that has requested print processing to a virtual device that executes print processing, the main body of a virtual printer on which the virtual device has been installed is not limited to be arranged at the same location as that of the image forming apparatus or the location adjacent thereto. For example, when the image forming apparatus is located in Japan and the main body of the virtual printer is located in U.S.A., a time lag in the communication between the image forming apparatus and the virtual printer may occur. Thus, it may take a long time until a service utilizing resources of the virtual printer is received by a user of the image forming apparatus.

Also, when the resources of the server (virtual printer) managed by the server management apparatus vary, a Web service corresponding to processing requested by the image forming apparatus may vary. In such a case, depending on the application of the service bus association method disclosed in Japanese Patent Laid-Open No. 2010-9218, it may be difficult to select a Web service corresponding to processing requested by the image forming apparatus.

SUMMARY OF THE INVENTION

The Web service system of the present invention includes an image forming apparatus and a server management apparatus that manages a server for providing a Web service corresponding to processing requested by the image forming apparatus, and selects an appropriate Web service depending on the location of the image forming apparatus and the requested processing content.

The Web service system of an aspect of the present invention includes an image forming apparatus and a server management apparatus that manages a plurality of servers for providing a Web service corresponding to processing requested by the image forming apparatus. The server management apparatus includes a first acquisition unit configured to acquire location information about a server and resource information about the resource of the server from the servers and to manage the acquired information as server information, a request reception unit configured to receive a processing request from the image forming apparatus, a second acquisition unit configured to acquire location information about the image forming apparatus from the image forming apparatus, and a selection unit configured to select a server for providing a Web service corresponding to the processing request from the plurality of servers on the basis of server information managed by the first acquisition unit, a processing request received by the request reception unit, and location information about the image forming apparatus acquired by the second acquisition unit to thereby assign one selected server to the image forming apparatus.

Further features of the present invention will become apparent from the following description of exemplary embodiments with reference to the attached drawings.

BRIEF DESCRIPTION OF THE DRAWINGS

FIG. 4 is an exemplary functional block diagram of the units provided in a Web service system.

FIGS. 5A to 5D are examples of client location information and provider information.

DESCRIPTION OF THE EMBODIMENTS

Figure 1:
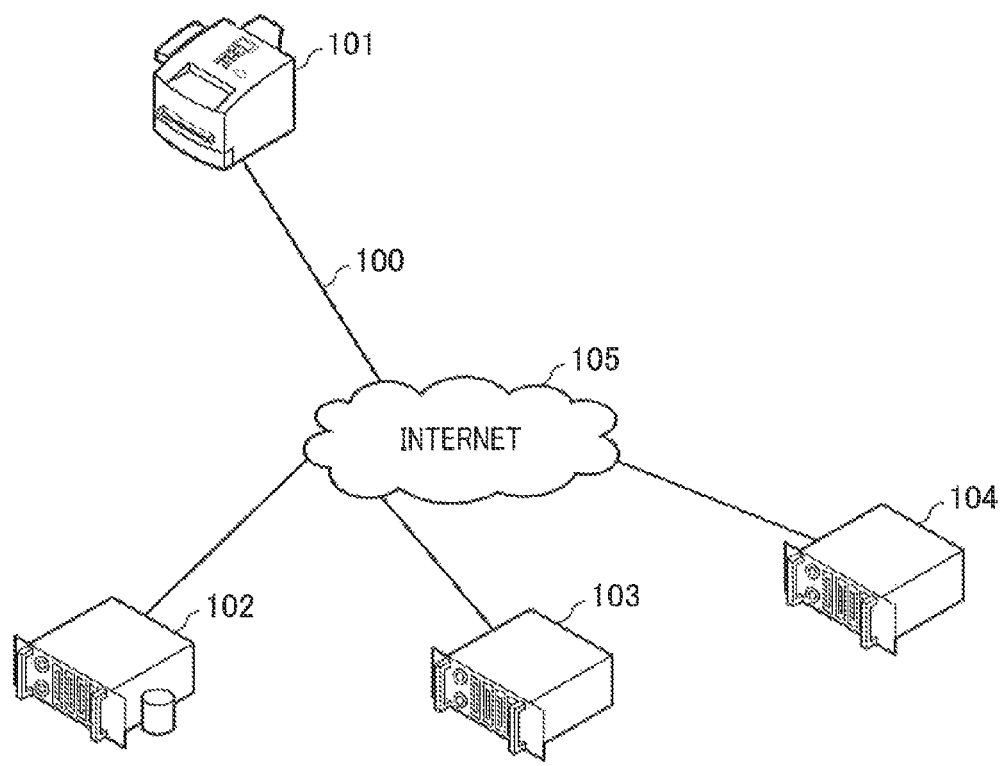
FIG. 1 is a diagram illustrating an example of the configuration of a Web service system of the present embodiment.

FIG. 1 is a diagram illustrating an example of the configuration of a Web service system of the present embodiment. The Web service system shown in FIG. 1 includes as printer 101, a virtual device management server 102, virtual device servers 103 and 104. The Web service providing method of the present embodiment is realized by, for example, the Web service system shown in FIG. 1. Also, the computer program of the present embodiment is a program for implementing the Web service providing method. Note that the number of the virtual device servers provided in the Web service system may be one or any plural number equal to or greater than three. Each of the printer 101 to the virtual device server 104 holds the corresponding IP address, where IP is an abbreviation for Internet Protocol.

The printer 101 to the virtual device server 104 are allowed for communication via a network such as Internet 105 or the like. Of course, the printer 101 to the virtual device server 104 may provide communication via a wireless LAN such as IEEE 802.11 or the like.

Given that the functions of the Web service system of the present embodiment are implemented, the operation of a program on the printer 101, the virtual device management server, and the virtual device server may be executed using a CPU, RAM, and ROM on a printer, where CPU is an abbreviation for Central Processing Unit, RAM is an abbreviation for Random Access Memory, and ROM is an abbreviation for Read Only Memory. Also, the operation of a program on the virtual device management server 102 and on the virtual device server may be executed in a virtual computer environment.

The printer 101 is the image forming apparatus of the present embodiment. The printer 101 may be a printer that provides a print function or may be a multi-function peripheral (MFP) or the like that provides multi-functions such as printing, scanning, faxing, and the like.

In the present embodiment, the printer 101 makes a processing request to the virtual device management server 102. The processing request is, a print processing request for, for example, print processing. The print processing request includes a print job for executing print processing for print data. In other words, the printer 101 functions as a client for a Web service.

The printer 101 incorporates communication protocol for communication with the virtual device management server 102, the virtual device server 103, and the virtual device server 104. The printer 101 executes transmission/reception of a request (processing request) between the printer 101 and the virtual device management server or the virtual device server using the incorporated communication protocol. Examples of such communication protocol include HTTP, file transfer, SNMP, WS-Eventing, and the like.

Each of the virtual device management server 102, and the virtual device servers 103 and 104 provides a service corresponding to a request from the printer 101 serving as the source of the request. The virtual device management server 102 functions as a server management apparatus that manages the virtual device servers 103 and 104. More specifically, the virtual device management server 102 provides a virtual device management function as a Web service. The virtual device management function is a function that manages the creation, deletion, or the like of a virtual device.

Also, the virtual device is a processing execution unit (that provides a Wed service) that executes processing in accordance with the processing request from the printer 101 on the virtual device server. The virtual device management server 102 selects a virtual device server in accordance with the processing request from the printer 101, and instructs the selected virtual device server to create a virtual device for providing a Web service corresponding to the processing request.

Each of the virtual device servers 103 and 104 is a server that provides a Web service corresponding to processing requested by the printer 101. More specifically, the virtual device server creates a virtual device service as a virtual device in accordance with the instruction given by the virtual device management server 102. The virtual device service executes processing requested by the printer 101 on behalf of the printer 101 to thereby return the result of the execution of the processing back to the printer 101. In the present embodiment, it is assumed that the virtual device server 103 provides a Web service in Japan and the virtual device server 104 provides a Web service in U.S.A.

A description will be given by taking an example of a case in which the printer 101 requests an image processing service to the virtual device management server 102. The virtual device management server 102 selects a virtual device server corresponding to the image processing service, and instructs the selected virtual device server to create the instances of a virtual device service corresponding to the image processing service. The virtual device management server 102 manages a virtual device service (the instances thereof) created by a virtual device server for each Web service. In this example, the virtual device management server 102 stores provider information including information about the instance of a virtual device service corresponding to an image processing service in a service registry storage unit 505 for management.

Each of the instances of a virtual device is functioning on a virtual machine (VM). VM is a virtual PC in which hardware resources required for a virtual device service, such as a memory, a CPU, or the like of a physical PC are virtually configured as a single PC. The printer 101 utilizes a virtual device service realized by the VM, whereby a Web service (in this example, an image processing service) is provided.

More specifically, in the same manner as in image processing performed by the printer 101, the virtual device service performs rasterize processing for print data from a drawing command (PDL), and converts the rasterized print data to drawing data on papers. Also, the virtual device service executes processing on the basis of various color processing and engine unique information.

When the image processing unit provided in the printer 101 executes image processing, there is a restriction depending on a resource such as a CPU, RAM, or the like or a program stored in ROM. However, in the present embodiment, the virtual device service executes image processing on behalf of the printer 101, and thus, such restriction is small. Thus, the virtual device service can execute image processing at a high speed as compared with a case where the printer 101 performs image processing. Also, even when the image processing unit provided in the printer 101 is defective, the virtual device service can perform image processing on behalf of the printer 101.

Examples of other Web services provided by a virtual device include Scan service, data compression/expansion service, data encryption/decryption service, Web server service, storage service, mail service, and the like.

Also, the functions of the virtual device management server 102 and the virtual device servers 103 and 104 may be realized by a physical PC or may also be realized by a virtual OS or a virtual PC such as a virtual disk or the like. Further, the communication between the apparatuses included in the Web service system of the present embodiment may be any type of communication using address information. For example, a communication protocol such as IPv4, IPv6, or the like may be applied to the communication. The communication protocol is not intended to limit a protocol in each respective one of a physical layer, a data link layer, a network layer, a transport layer, a session layer, a presentation layer, and an application layer of an OSI reference model.

Figure 2:
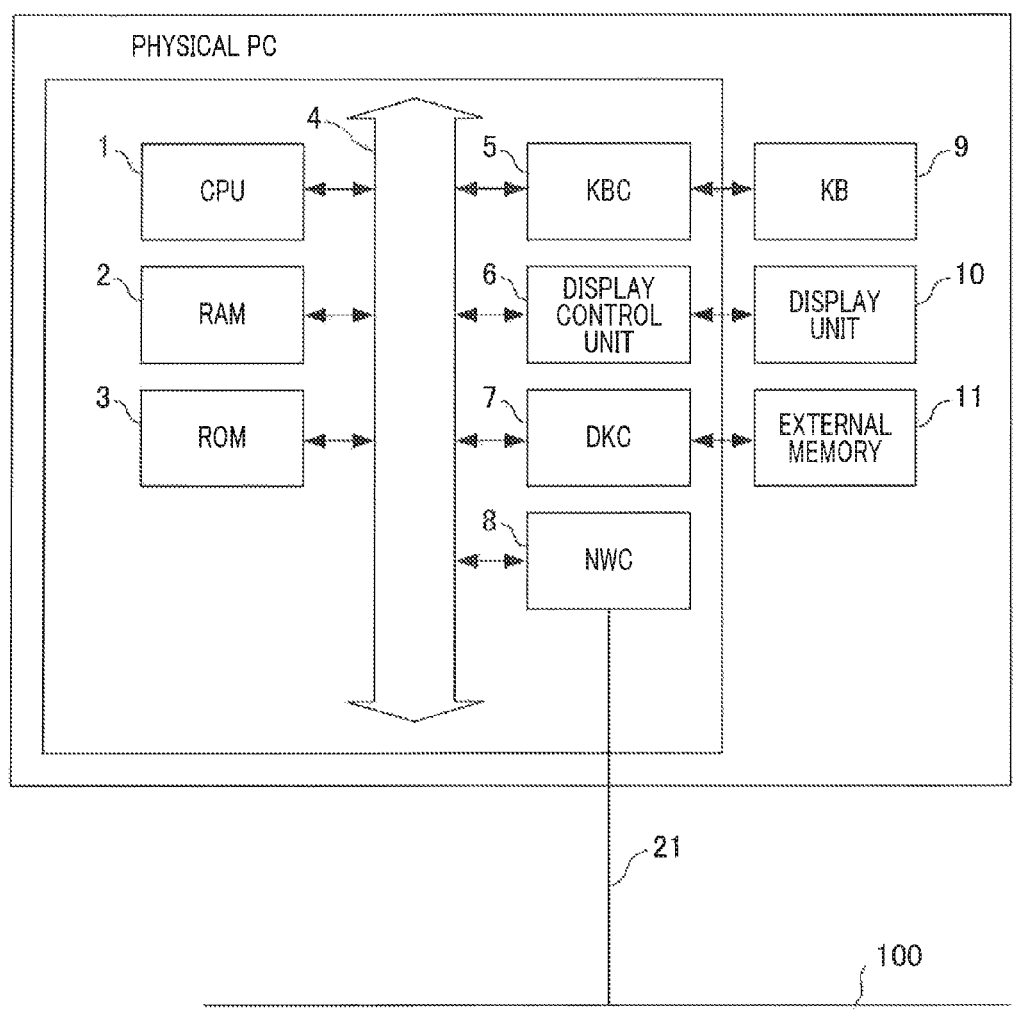
FIG. 2 is a diagram illustrating sin example of the hardware configuration of a physical PC for implementing a virtual device server.

FIG. 2 is a diagram illustrating an example of the hardware configuration of a physical PC for implementing a virtual device server. When the Web service system includes a host computer (not shown) that provides a print instruction to the printer 101, the host computer has the same hardware configuration as that of the physical PC shown in FIG. 2.

The physical PC shown in FIG. 2 includes a CPU (Central Processing Unit) 1, RAM (Random Access Memory) 2, and ROM (Read Only Memory) 3. Also, the physical PC includes a KBC (Keyboard Controller) 5, and a display control unit 6. The physical PC further includes a DKC (Disk Controller) 7, an NWC (Network Controller) 8, a KB (Keyboard) 9, a display unit 10, and an external memory 11.

The CPU 1 is a central processing unit that collectively controls the units connected to as system bus 4. The CPU 1 executes the various processing operations for documents, in which graphic patterns, images, characters, tables (including table calculation or the like), and the like are mixed, on the basis of an application (document processing program or the like) stored in a ROM for program of the ROM 3 or the external memory 11. Also, the CPU 1 executes, for example, an expanding (rasterizing) process of an outline font into a display RAM set on the RAM 2, and displays the expanded outline font on the display unit 10 via the display control unit 6. The display unit 10 is, for example, a CRT and the display control unit 6 is, for example, a CRTC.

Also, the CPU 1 opens various registered windows and executes various data processes on the basis of commands instructed by a mouse cursor or the like on the display unit 10. When as user uses as client application or a server service, a user can open as window regarding operations for the settings to thereby make the settings. The display unit 10 is not limited to a CRT, but may be a liquid crystal, plasma, or the like.

The RAM 2 functions as a main memory, a work area, or one like of the CPU 1. The ROM 3 includes a ROM for font, a ROM for program, a ROM for data, or the like, all of which are not shown. A ROM for font or the external memory 11 stores font data or the like for usage during document processing or the like.

The ROM for program or the external memory 11 stores an operating system (hereinafter referred to as "OS") that is the control program of the CPU 1 or the like. The ROM for data or the external memory 11 stores various data for usage during the aforementioned document processing or the like. A program stored in the external memory 11 is expanded on and executed by the RAM 2 upon execution.

The KBC 5 controls input information input by the KB 9 and a pointing device (not shown). The display control unit 6 controls displaying on the display unit 10. The DKC 7 controls access to the external memory 11. The NWC 8 is connected to a network 106 via a bi-directional interface 21.

A keyboard 9 includes various keys. The display unit 10 displays graphic patterns, image characters, tables, and the like. The external memory 11 includes a HD (Hard Disk), a floppy (registered trademark) disk, and the like. The external memory 11 stores a boot program, various applications, font data, a user file, an edit file, or the like.

Figure 3A:
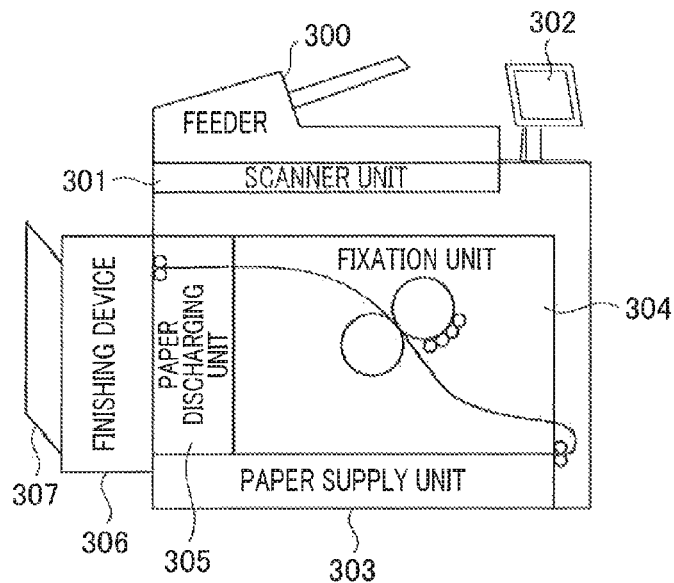
FIGS. 3A and 3B are diagrams illustrating an example of the configuration of a printer.

FIG. 3 is a diagram illustrating an example of the configuration of a printer. FIG. 3A shows an exemplary external appearance of the printer 101. In this example, the printer 101 is assumed to be a MFP. A feeder 300 (original automatic feeding unit) provided in the printer 101 is a mechanism that automatically feeds paper when scanning is performed by a scanner unit 301. The scanner unit 301 for reading an original document scans paper information and converts them into electronic data.

A UI unit 302 receives an MFP input operation. Also, the UI unit 302 displays various information. A paper feeding unit 303 is a mechanism that feeds printing paper to a fixation unit 304 during printing. The fixation unit 304 is a mechanism that fixes a toner onto a paper fed from the paper feeding unit 303. A paper discharging unit 305 is a mechanism that discharges a paper on which a toner has been fixed by the fixation unit 304. A finishing device 306 is a mechanism that performs processing such as stapling, punching, or the like for a paper, which has been discharged from the paper discharging unit 305, in accordance with ordering information. A paper discharging tray 307 is a tray that holds printed matter finally subject to printing and finishing.

Figure 3B:
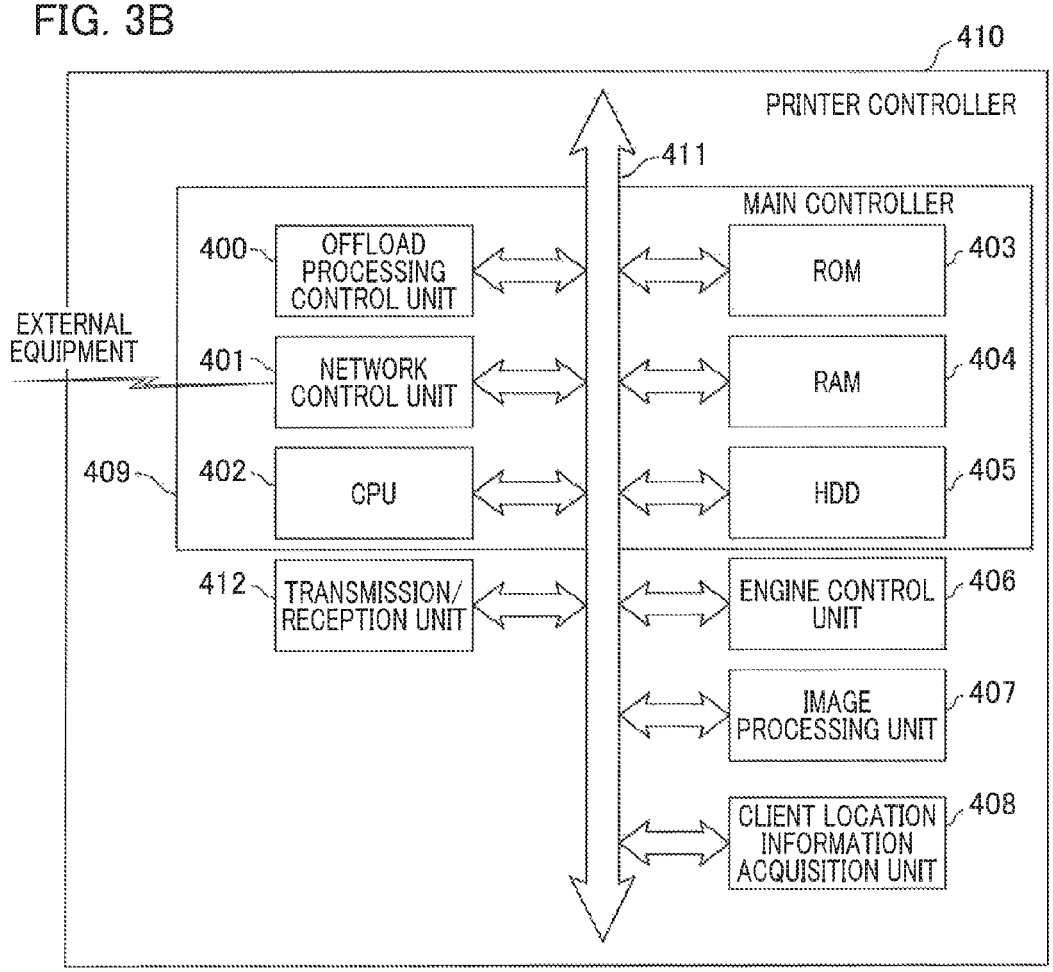

FIG. 3B shows a printer controller provided in a printer. The printer controller 410 includes a main controller 409, an engine control unit 406, an image processing unit 407, a client location information acquisition unit 408, and a transmission/reception unit 412.

The main controller 409 controls the overall print function. More specifically, the main controller 409 performs input/output control with the external, and controls a print function by providing instructions to the engine control unit 406, the image processing unit 407, or the like.

An offload processing control unit 400 provided in the main controller 409 is a main control unit that communicates with the virtual device management server 102 and the virtual device server with regard to processing for MFP. An offload control unit 400 is operated by the CPU 402, the ROM 403, the RAM 404, the HDD 405, and a network control unit 401 on the main controller 409. These components are independently provided as dedicated hardware for controlling the offload processing control unit 400, and thus, a high availability system can be constructed.

The network control unit 401 controls communication with an external equipment. The network control unit 401 receives a print instruction or receives a configuration information acquisition instruction from a client PC (not shown) via the LAN 100, and transmits the results of processing in accordance with the instruction. Also, the network control unit 401 communicates with the virtual device management server 102 and the virtual device server via the LAN 100 or the Internet 105.

The CPU 402 is a central processing unit that controls the units connected to a controller bus 411. The CPU 402 executes the various processing operations for controlling the printer 101 on the basis of a program stored in ROM for program in the ROM 403 or the HDD 405 serving as an external memory.

The ROM 403 functions as a storage region for storing a program or the like executed by the CPU 402. The RAM 404 functions as a main memory, a work area, or the like for the CPU 402. The HDD 405 functions as a storage region for storing a program, a work area, and user data.

The engine control unit 406 controls the print function of the printer 101. Here, controlling a print function refers to controlling paper transfer and a fixation device. More specifically, the engine control unit 406 feeds a paper, which has been conveyed from the paper feeding unit 303, to the fixation unit 304 so as to transfer drawing data processed by the image processing unit 407 onto the paper. The fixation unit 304 fixes a toner onto the paper fed from the paper feeding unit 303 for printing. The paper printed by the fixation unit 304 is conveyed to the paper discharging unit 305.

The image processing unit 407 performs rasterize processing for print data from a drawing command (PDL), and converts the rasterize print data to drawing data on paper. Also, the image processing unit 407 performs processing on the basis of various color processing and engine unique information.

The client location information acquisition unit 408 acquires client location information representing information about the location of the printer 101, and transmits client location information to the virtual device management server 102 via the transmission/reception unit 412 and the Internet 105. The client location information acquisition unit 408 acquires physical location information or relative location information as client location information. Physical location information is information about the physical location of the printer 101. Relative location information is information about the relative location between the printer 101 and the virtual device server.

The virtual device management server 102 to be described below selects a virtual device server, which provides a Web service corresponding to a processing request made from the printer 101, using client location information acquired from the printer 101. The transmission/reception unit 412 transmits/receives information between the virtual device management server 102 and the virtual device server in accordance with the instruction given by the main controller 409.

FIG. 5A shows an example of physical location information. An example of physical location information includes regional information. The client location information acquisition unit 408 acquires, for example, region information, locale information, a local time, GPS information, user setting location information, virtual PC location information, physical PC location information, an IP address, network domain information, or the like as physical location information.

FIG. 5B shows an example of relative location information. Relative location information is information about the relative location between the printer 101 and the virtual device server. Examples of relative location information include a network configuration map, a network node-to-node distance, a communication delay time RTT (Round Trip Time), the time difference between two local times, or the like.

Service identification shown in FIG. 5B indicates a virtual device server for providing a Web service. For example, a service identifier corresponding to a virtual device server for providing a print service is "Print001", "Print002", or "Print003". The number of hops is the number of times passed through a router during communication between the printer 101 and each virtual device server. A communication delay is a communication delay time RTT during communication between the printer 101 and each virtual device server. A time difference is the time difference between two local times of the printer 101 and each virtual device server.

FIG. 4 is an exemplary functional block diagram of the units provided in a Web service system. As a premise for the description of FIG. 4, a printer driver running on a client PC (not shown) creates print data and passes the print data to the printer 101 in accordance with a print instruction received from a predetermined application. The printer 101 transmits a print processing request including a job (print job) for performing print processing for the passed print data to the virtual device management server 102 via the Internet 105.

Since the units provided in the printer 101 have been described with reference to FIG. 3B, a detailed description with reference to FIG. 4 is omitted. A description will be given of the processing units provided in the virtual device management server 102 and the virtual device servers 103 and 104. The processing units provided in the virtual device management server 102 and the virtual device servers 103 and 104 are stored in a ROM, an external memory, or the like, and are executed by a CPU using a RAM as appropriate. The processing units that are common to the virtual device management server 102 and the virtual device servers 103 and 104 are designated by the same reference numerals, and thus, an explanation thereof will be omitted.

A transmission/reception unit 501 transmits/receives information between the printer 101 and the network control unit 401 using the NWC 8 (see FIG. 2). For example, the transmission/reception unit 501 receives a processing request and an information acquisition instruction from the printer 101, and transmits their response thereto to the printer 101.

Assume the case where the main controller 409 of the printer 101 causes a virtual device service 515 created in the virtual device server 103 to execute proxy processing for the image processing unit 407. In this case, the transmission/reception unit 412 transmits an instruction for executing the proxy processing to the transmission/reception unit 501 of the virtual device server 103 in accordance with the instruction given by the engine control unit 406. The transmission/reception unit 501 of the virtual device server 103 returns the result of the execution of proxy processing back to the transmission/reception unit 412 of the printer 101.

Proxy processing for the image processing unit 407 is not limited to the execution of print processing. Also, the main controller 409 of the printer 101 may cause the virtual device service 515 created in a virtual device server to execute proxy processing for the engine control unit 406. Also, when an error occurs in the engine control unit 406 or the image processing unit 407, the main controller 409 of the printer 101 may cause the virtual device service 515 created in a virtual device server to execute processing regarding the error.

A Web server 502 is a Web service server that communicates with the transmission/reception unit 412 of the printer 101 using a REST protocol, a SOAP protocol, or the like. Also, the Web server 502 communicates with a virtual device management unit 503 of the virtual device management server 102 using a REST protocol, a SOAP protocol, or the like. A protocol for usage in communication according to the present embodiment is not limited to a REST protocol or a SOAP protocol. Communication between the printer 101 and the Web server 502 may be established using a TCP or a UDP protocol, an HTML protocol, or the like.

The Web server 502 provided in the virtual device management server 102 receives a processing request from the printer 101, and passes the processing request to the virtual device management unit 503. The virtual device management unit 503 functions as a request reception unit that receives the processing request. Also, the Web server 502 passes response information, which has been received from the virtual device management unit 503, to the transmission/reception unit 501.

For example, assume the case where a drawing processing request is made from the printer 101 to the Web server 502. The drawing processing request includes a drawing command (PDL). The virtual device management unit 503 passes information (access information) for gaining access to a virtual device server, which performs drawing processing in accordance with the drawing command, as response information to the transmission/reception unit 501. Access information for a virtual device server is, for example, information about the end-point of a virtual device server. The transmission/reception unit 501 transmits response information back to the transmission/reception unit 412 of the printer 101.

Each of the Web servers 502 provided in the virtual device servers 103 and 104 receives a request from the virtual device management server 102 or the printer 101, and passes the request to a virtual device control unit 514. Also, the Web server 502 passes response information received from the virtual device control unit 514 to the transmission/reception unit 501.

The virtual device management unit 503 provided in the virtual device management server 102 exchanges information with the printer 101. For this purpose, the virtual device management unit 503 controls to invoke a necessary processing unit(s) provided in the printer controller 410. Also, the virtual device management unit 503 instructs the virtual device control unit 514 provided in each of the virtual device servers 103 and 104 to thereby control the virtual device service 515. For controlling the virtual device service 515, the virtual device management unit 503, the Web server 502, and the transmission/reception unit 501 may also process requests from a plurality of printers 101 using one instance.

When the number of the printers 101, which serve as the processing request sources for the virtual device management server 102 and the virtual device servers 103 and 104 is large, a network load balancer may also be provided for holding a numerous number of TCP sessions for a long period of time. With this arrangement, a large-scale system may readily be made.

Next, a description will be given of the function of the virtual device management server 102 as a host computer, a provider that is a Web server service running on the host computer, and a Web service running on a Web server according to the present embodiment. In the present embodiment, the virtual device service 515 operates as a Web service.

A provider information management unit 504 functions as a first acquisition unit that acquires information (server information) about a virtual device server as provider information from the virtual device server. The provider information management unit 504 registers the acquired provider information in the service registry storage unit 505. Provider information includes location information about a virtual device server, resource information about the virtual device server, and hardware resource information about the virtual device server. These information is associated with a Web service provided by the virtual device service 515 of a virtual device server.

A provider location information acquisition unit 512 of a virtual device server acquires location information about the virtual device server. A resource information acquisition unit 511 acquires resource information about the virtual device server. Also, a hardware resource information acquisition unit 510 acquires hardware resource information about the virtual device server. Then, the transmission/reception unit 501 passes provider information including location information about the virtual device server, resource information about the virtual device server, and hardware resource information about the virtual device server to the provider information management unit 504 of the virtual device management server 102.

Location information about a virtual device server includes regional information. Examples of regional information include region information, locale information, and a local time. Location information about a virtual device server also includes physical location information or relative location information. Examples of physical location information includes GPS information, user setting location information, virtual PC location information, physical PC location information, an IP address, and network domain information. Relative location information includes a network configuration map, a network node-to-node distance, a communication delay time RTT, and the time difference between two local times.

Examples of resource information includes the CPU usage rate of each of a physical PC, a host OS, and a virtual PC, the usage rate of a Network card, the usage rate of a disk I/O, the transmission rate of a disk, the transfer amount of a network card, the transmission rate of a virtual network, and the available space of a disk.

FIG. 5C shows an example of location information about a virtual device server, which is included in provider information. FIG. 5D shows an example of resource information included in provider information. Location information and resource information about a virtual device server are associated with each Web service. Each identifier shown in FIGS. 5C and 5D indicates each Web service.

In the present embodiment, when a virtualization technique such as a virtual PC, a virtual server, a virtual OS, or the like is used, a virtual device server can acquire resource information from a virtualization management interface on an operating system or a virtual OS. Hardware resource information can also be acquired from a host OS for managing a virtual OS or from a virtual OS.

The service registry storage unit 505 stores the provider information acquired by the provider information management unit 504. A service provider determination unit 506 selects a virtual device server for providing a Web service corresponding to the processing request from the printer 101, and the virtual device service 515 running on the virtual device server in accordance with the instruction given by the virtual device management unit 503.

The service provider determination unit 506 executes the following processing in accordance with the instruction given by the virtual device management unit 503. The service provider determination unit 506 determines a virtual device server and a virtual device service to be selected on the basis of the content of the processing request acquired from the printer 101, client location information, and provider information stored in the service registry storage unit 505. In other words, the provider information management unit 504, the service provider determination unit 506, and the virtual device management unit 503 collectively function as a selection unit that selects a virtual device server for providing a Web service corresponding to the processing request and assigns the selected virtual device server to the image forming apparatus 101.

A service deploy unit 507 executes service deploy processing in accordance with the instruction given by the virtual device management unit 503. Service deploy processing is processing for activating the virtual device service 515 created in a virtual device server for processing a processing request from the selected virtual device server, i.e., the printer 101. For this purpose, firstly, the virtual device management unit 503 determines the activation destination of the virtual device service 515 on the basis of the determination result of the service provider determination unit 500. Then, the service deploy unit 507 installs or sets up software required when a virtual device server creates the virtual device service 515.

Software to be installed and set up includes a hypervisor, an operating system, a Web server service, a database service, a Web service, and an enterprise service bus.

A hypervisor is OS virtualization software that virtualizes an operating system. Also, this software includes a service registry client, a virtual device service, or the like. The service deploy unit 507 installs this software in a virtual device server for processing a processing request from the printer 101, and further activates the virtual device service 515 for processing a processing request from the printer 101.

In order to activate the virtual device service 515 at high speed, the service deploy unit 507 may be prepared in advance for installation of software on the basis of the demand/supply prediction obtained by the processing request from the printer 101. For example, the service deploy unit 507 activates the virtual device service 515 independent of the printer 101, of which the set values are default values, and sets up the virtual device service 515 in accordance with the processing request from the printer 101. With this arrangement, the virtual device service 515 can be activated at high speed.

A resource monitoring unit 508 monitors resource information included in provider information stored in the service registry storage unit 505. More specifically, the resource monitoring unit 508 functions as a monitoring unit that monitors a change in the state of the resources of a plurality of virtual device servers.

Resource information is variable depending on creation or extinguishment of the virtual device service 515 by a virtual device server or depending on the load of the virtual device service 515 that executes processing in accordance with the processing request from the printer 101. Also, when a virtual device server on which the virtual device service 515 is activated is running on a virtual OS, resource information may vary depending on the load state of another virtual OS. In such a case, the resource monitoring unit 508 detects variations in resource information, and the service provider determination unit 506 again determines a virtual device server and the virtual device service 515 that are capable of optimally processing a processing request from the printer 101.

In other words, the service provider determination unit 506 specifies a virtual device server having resources, which satisfy the conditions for providing the Web service that is currently been provided, depending on the monitoring result of a change in the state of resources. The service provider determination unit 506 selects a server for providing the Web service that is currently been provided on the basis of the results of comparison between physical location information and location information about the specified virtual device server or relative location information. Then, the virtual device management unit 503 switches a virtual device server for providing the Web service from the server that is currently providing the Web service to the selected server.

When the service provider determination unit 506 again determines the virtual device server and the virtual device service 515, a Web service shifting unit 509 executes the following processing. The Web service shifting unit 509 changes the virtual device server and the virtual device service 515 that provide a Web service in accordance with the processing request managed by provider information.

While the number of virtual device servers shown in FIG. 4 is two, the Web service system of the present embodiment may also have a configuration in which three or more scaled-out virtual device servers are provided. For example, depending on the number of printers 101 that are the sources of at a processing request or the processing load of a virtual device server, the virtual device server is scaled out. A large-scale system may be constructed by connecting the scaled-out virtual device server and the virtual device management server 102 via a service bus.

The virtual device management unit 503 instructs the virtual device control unit 514 of a virtual device server, which has been added by scaling-out, to created the virtual device service 515. The virtual device control unit 514 creates the virtual device service 515, and loads application and setting information to the created virtual device service 515 to thereby increase the virtual device service 515 that is capable of being processed.

The virtual device management unit 503 may also be adapted to add not only the virtual device service 515 but also an operating system or the Web server 502 on VM. Scale-down processing may be performed by reducing the virtual device service 515 and the virtual device server.

The hardware resource information acquisition unit 510 provided in the virtual device server acquires information about hardware resources installed on the virtual device server. Hardware resource information includes information (device information) about a device for performing hardware processing for the processing request from the printer 101.

Hardware resource information includes, for example, information about a SSL accelerator for processing SSL communication at high speed and information about GPU for processing an encryption accelerator and image processing at high speed. Hardware resource information also includes information about a compression/decompression accelerator for processing data compression/decompression and information about a wide band network card for high-speed communication. Hardware resource information further includes information about a memory or a CPU and storage information.

Also, examples of device information include information about the processing in support and the status of device. For example, device information about an SSL accelerator is the protocol version of SSL or TLS. Also, device information about a compression/decompression accelerator includes a compression algorithm, its attribute, or the like.

The resource information acquisition unit 511 acquires the above mentioned resource information. The provider location information acquisition unit 512 acquires the above mentioned virtual device server location information. A provider location information storage unit 513 stores virtual device server location information acquired by the provider location information acquisition unit 512.

The virtual device control unit 514 executes the following processing in accordance with the instruction received from the virtual device management unit 503 of the virtual device management server 102. The virtual device control unit 514 acquires hardware resource information from the hardware resource information acquisition unit 510. Also, the virtual device control unit 514 acquires resource information from the resource information acquisition unit 511. Further, the virtual device control unit 514 acquires virtual device server location information from the provider location information storage unit 513. Then, the virtual device control unit 514 transmits all of these acquired information as provider information to the virtual device management server 102 via the transmission/reception unit 501.

Also, the virtual device control unit 514 creates the virtual device service 515. The virtual device service 515 is a Web service that executes processing in accordance with the processing request from the printer 101. The virtual device service 515 runs on the Web server 502. For example, the virtual device service 515 performs proxy processing for the image processing unit 407 of the printer 101. When the image processing unit 407 of the printer 101 is defective or it takes time for processing because of the insufficient processing power of the image processing unit 407, the virtual device service 515 performs processing on behalf of the image processing unit 407.

The virtual device service 515 may also be adapted to execute processing of the functions not provided in the printer 101. For example, when the printer 101 does not have an OCR function, the virtual device service 515 provides the OCR function. With this arrangement, the OCR function can be implemented as if the OCR function has been added to the printer 101. The virtual device service 515 loads a program for each function for implementing the functions of the virtual device service 515. With this arrangement, the virtual device service 515 is capable of providing various functions on behalf of the printer 101.

A Web service provided by the virtual device service 515 is managed by the provider information management unit 504 of the virtual device management server 102. More specifically, virtual device server location information, virtual device server resource information, and virtual device server hardware resource information, which have been associated with the Web service, are stored as provider information in the service registry storage unit 505. With this arrangement, the virtual device management unit 503 can create and search a Web service provided by the virtual device service 515.

A description will be given of the assignment of a Web service in accordance with the processing request from the printer 101 to the printer 101. As described above, it is assumed that the virtual device server 103 provides a Web service in Japan and the virtual device server 104 provides a Web service in U.S.A.

The service provider determination unit 506 of the virtual device management server 102 executes the following processing on the basis of provider information acquired from the service registry storage unit 505 and a Web service indicated by the content of the processing request from the printer 101. The service provider determination unit 506 acquires virtual device server location information that has been associated with the Web service. The service provider determination unit 506 executes the following processing when client location information acquired from the printer 101 is physical location information.

The service provider determination unit 506 compares the physical location information with the acquired virtual device server location information, and executes the following processing on the basis of the comparison result. The service provider determination unit 506 selects a virtual device server, which is arranged at a location closest to the physical location of the printer 101, as a virtual device server for providing a Web service corresponding to the processing request.

For example, when the service provider determination unit 506 has selected the virtual device server 103 in Japan as the virtual device server for providing a Web service corresponding to the processing request, the virtual device service 515 is created in the virtual device server 103. Also, for example, when the service provider determination unit 506 has selected the virtual device server 103 in U.S.A. as the virtual device server for providing a Web service corresponding to the processing request, the virtual device service 515 is created in the virtual device server 103.

The service provider determination unit 506 may select a virtual device server for providing a Web service corresponding to the processing request on the basis of not only region information but also a data center such as Tokyo, Osaka, or the like and the physical PC location in the data center.

When client location information is relative location information, the service provider determination unit 506 may select a virtual device server in the following manner. The service provider determination unit 506 selects, for example, a virtual device server having the shortest communication delay time RTT with the printer 101, as a virtual device server for providing a Web service corresponding to the processing request.

Figure 6:
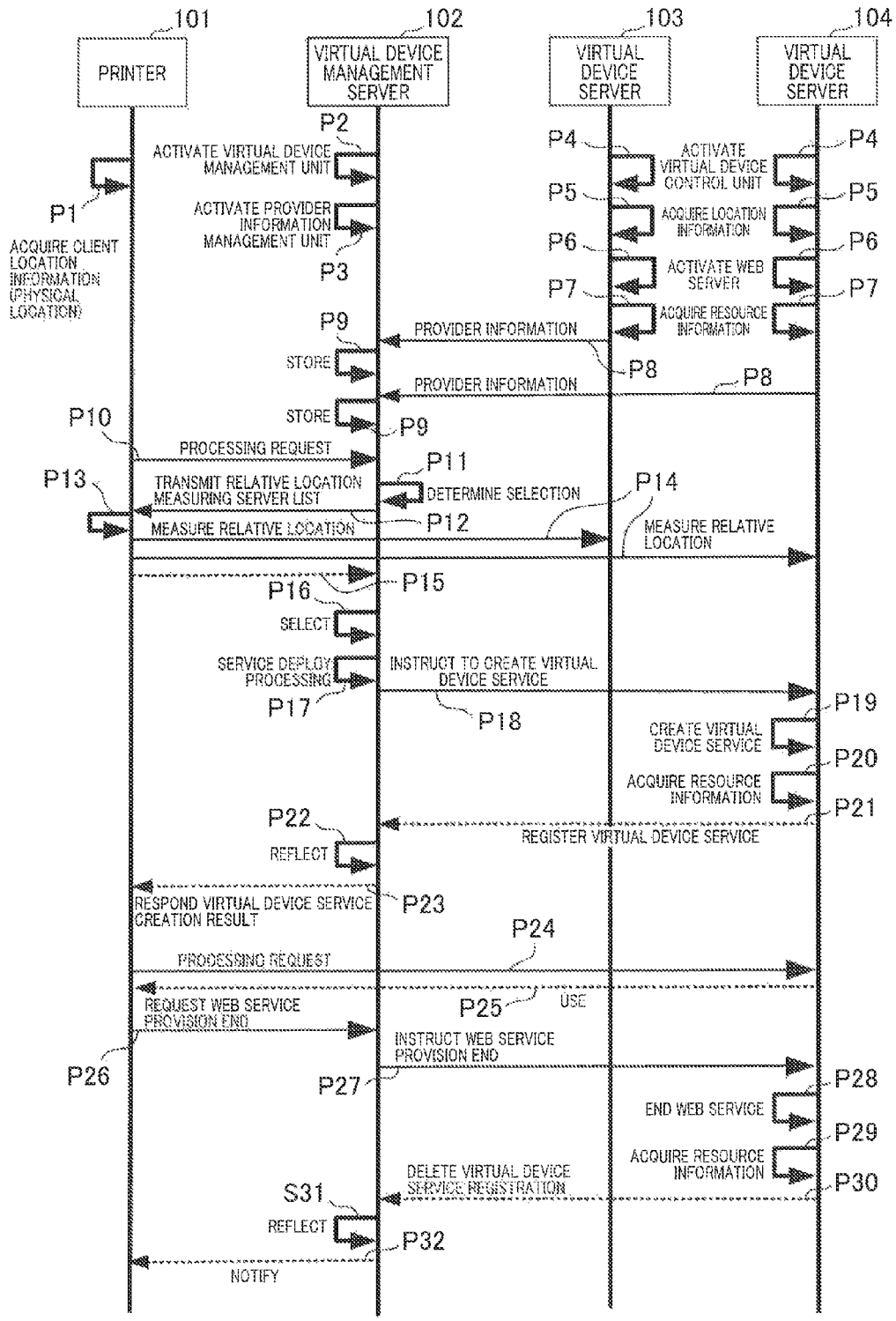
FIG. 6 is a sequence diagram illustrating an example of operation processing performed by a Web service system.

FIG. 6 is a sequence diagram illustrating sin example of operation processing performed by a Web service system. Firstly, the client location information acquisition unit 408 of the printer 101 acquires physical location information about a client (P1). Next, the virtual device management unit 503 of the virtual device management server 102 is activated (P2). Next, the provider information management unit 504 is activated (P3).

Next, the virtual device control unit 514 of each of the virtual device servers 103 and 104 is activated (P4). With this arrangement, the virtual device service 515 is ready for provision. Next, the provider location information acquisition unit 512 is activated, and then the provider location information acquisition unit 512 acquires virtual device server location information (P5).

Next, the Web server 502 of each of the virtual device servers 103 and 104 is activated (P6). Next, the hardware resource information acquisition unit 510 is activated to acquire hardware resource information. Also, the resource information acquisition unit 511 is activated to acquire resource information (P7).

Next, the virtual device servers 103 and 104 notify the virtual device management unit 503 of the virtual device management server 102 that the activation of the virtual device control unit 514 has been completed. At this point, the virtual device service 515 associated with the processing request of the printer 101 is not yet activated. The virtual device servers 103 and 104 transmit provider information including information acquired in P5 and P7 to the virtual device management server 102 (P8). Then, the virtual device management server 102 stores provider information in the service registry storage unit 505 (P9).

By means of the processes in P2 to P9, the virtual device management server 102 and the virtual device servers 103 and 104 are ready for providing the virtual device service 515 to the printer 101.

Next, the printer 101 determines the process to be executed by the virtual device service 515 of the virtual device server, and transmits a processing request to the virtual device management unit 503 of the virtual device management server 102 (P10). In P10, the printer 101 further transmits client location information acquired in P1 to the virtual device management server 102. When client location information (physical location information) has not been acquired in P1, client location information is not transmitted from the printer 101 to the virtual device management server 102.

When the processing units of the printer 101 perform special processing using hardware or software, the virtual device service 515 that executes proxy processing for the processing units needs to be able to perform the same processing as the aforementioned special processing.

Next, the virtual device management unit 503 of the virtual device management server 102 determines whether or not a virtual device server is selectable using client location information (physical location information) (P11). When a virtual device server is selectable using physical location information, the process subsequent to P16 is executed. When physical location information is not transmitted from the printer 101 or a virtual device server is not selectable using physical location information, the virtual device management server 102 determines that a virtual device server is not selectable using physical location information, and then executes the following processing.

Firstly, the virtual device management server 102 transmits a relative location measuring server list to the printer 101 (P12). The relative location measuring server list is a list of candidates of virtual device servers that provide a Web service in accordance with the processing request. The virtual device management server 102 selects, for example, a predetermined number of virtual device servers as candidates among virtual device servers that are capable of providing a Web service in accordance with the processing request, and includes them in the relative location measuring server list. In this example, it is assumed that the virtual device servers 103 and 104 are included in the relative location measuring server list.

Next, the printer 101 acquires the candidates for virtual device servers from the relative location measuring server list received from the virtual device management server 102

(P13). Then, the printer 101 acquires relative location information about the virtual device servers as the candidates (P14). More specifically, the printer 101 acquires relative location information by means of communication processing with the provider location information acquisition units 512 of the virtual device servers. The acquired relative location information, for example, includes a network configuration map, a network node-to-node distance, a communication delay time RTT, the time difference between two local times, or the like. The printer 101 transmits the acquired relative location information as client location information back to the virtual device management unit 503 of the virtual device management server 102 (P15).

Next, the virtual device management server 102 selects a virtual device server for providing a Web service in accordance with the processing request on the basis of the content of the processing request from the printer 101, client location information acquired from the printer 101, and provider information (P16). For example, the virtual device management server 102 refers to provider information, and acquires virtual device servers that are capable of providing the Web service. Then, the virtual device management server 102 refers to relative location information, and selects a virtual device server having the shortest communication delay time RTT with the printer 101 among the acquired virtual device servers.

Among the acquired virtual device servers, the virtual device management server 102 may also be adapted to select a virtual device server having the smallest number of hops, where the number of hops is the number of routers passed through the virtual device server and the printer 101. Among the acquired virtual device servers, the virtual device management server 102 may also be adapted to select a virtual device server having the smallest time difference between two local times of the virtual device server and the printer 101. In this example, it is assumed that the virtual device server 104 is selected.

Next, the virtual device management server 102 executes service deploy processing (P17). Then, the virtual device management unit 503 of the virtual device management server 102 instructs the virtual device server 104 to create the virtual device service 515 (P18). In P18, the virtual device management unit 503 further determines information and setting information about an application to be loaded into the virtual device service 515, and then transmits the determined information to the virtual device server 104.

Depending on the processing request from the printer 101, one virtual device service 515 may also perform proxy processing for a plurality of printers 101. The virtual device management server 102 determines whether or not the proxy processing can be performed on the basis of information about the operational virtual device service 515, which is included in provider information.

Also, the resource monitoring unit 508 of the virtual device management server 102 monitors the resources of the virtual device server 103 and the virtual device server 104. Then, when a margin for the resources of the virtual device server 103 which is located closer to the printer 101 is present, the virtual device management server 102 performs the following processing. The virtual device management server 102 changes a virtual device server for providing a Web service to the virtual device server 103, and instructs the virtual device server 103 to create the virtual device service 515.

In P19 shown in FIG. 6, the virtual device control unit 514 of the virtual device server 104 creates the virtual device service 515 in accordance with the instruction given by the virtual device management server 102. Also, the resource information acquisition unit 511 acquires virtual device server resource information, and notifies update information for resource information to the virtual device control unit 514 (P20). Update information for resource information is the updated resource information.

Next, the virtual device control unit 514 transmits the creation result of the virtual device service 515 and update information for resource information to the virtual device management unit 503 of the virtual device management server 102. With this arrangement, registration processing for the virtual device service 515 of the virtual device server 104 is performed (P21). The creation result of the virtual device service 515 includes information about the virtual device service 515 (for example, information about VM for implementing virtual device service).

The virtual device management unit 503 of the virtual device management server 102 notifies the creation result of the virtual device service 515 and update information for resource information to the provider information management unit 504. Then, the provider information management unit 504 reflects the notified information to provider information stored in the service registry storage unit 505 (P22).

Next, the virtual device management unit 503 of the virtual device management server 102 responds information about the virtual device service 515 stored in the virtual device server 104 with respect to the printer 101 (P23). Information about the virtual device service 515 transmitted back from the virtual device management unit 503 includes access information about the virtual device service 515 (for example, endpoint information).

Next, the printer 101 accesses a virtual device service of the virtual device server 104 using the aforementioned access information to make a process request. For example, when the printer 101 requests an image processing service, the virtual device server 104 creates the virtual device service 515 for image processing, which is specific to the printer 101, and assigns the virtual device service 515 to the printer 101 (P24). With this arrangement, a Web service is available for the printer 101. The provider information management unit 504 of the virtual device management server 102 manages the virtual device service 515 assigned to the printer 101 in the service registry storage unit 505.

When the printer 101 receives the process result from the virtual device service 515, the printer 101 makes a Web service provision end request to the virtual device management server 102 (P26). The Web service provision end request is a request for the end of providing a Web service provided by the virtual device service 515.

Next, the virtual device management unit 503 of the virtual device management server 102 instructs the virtual device control unit 514 of the virtual device server 104 to end the provision of a Web service provided by the virtual device service 515 (P27). The virtual device control unit 514 of the virtual device server 104 ends the provision of a Web service provided by the virtual device service 515 (P28). Also, the virtual device server 104 acquires update information for resource information as in P20 (P29).

Next, the virtual device control unit 514 of the virtual device server 104 transmits the end result of the Web service provided by the virtual device service 515 and update information for resource information to the virtual device management unit 503 of the virtual device management server 102. With this arrangement, processing for deleting the registration of the virtual device service 515 of the virtual device server 104 is performed (P30).

The virtual device management unit 503 of the virtual device management server 102 reflects information, which has been transmitted from the virtual device server 104, in provider information (P31). More specifically, the virtual device management unit 503 updates resource information included in provider information, and deletes an entry corresponding to the virtual device service 515, which has ended the provision of the Web service, among the entries included in provider information. Then, the virtual device management unit 503 notifies the end of the provision of the Web service to the printer 101 (P32).

Figure 7:
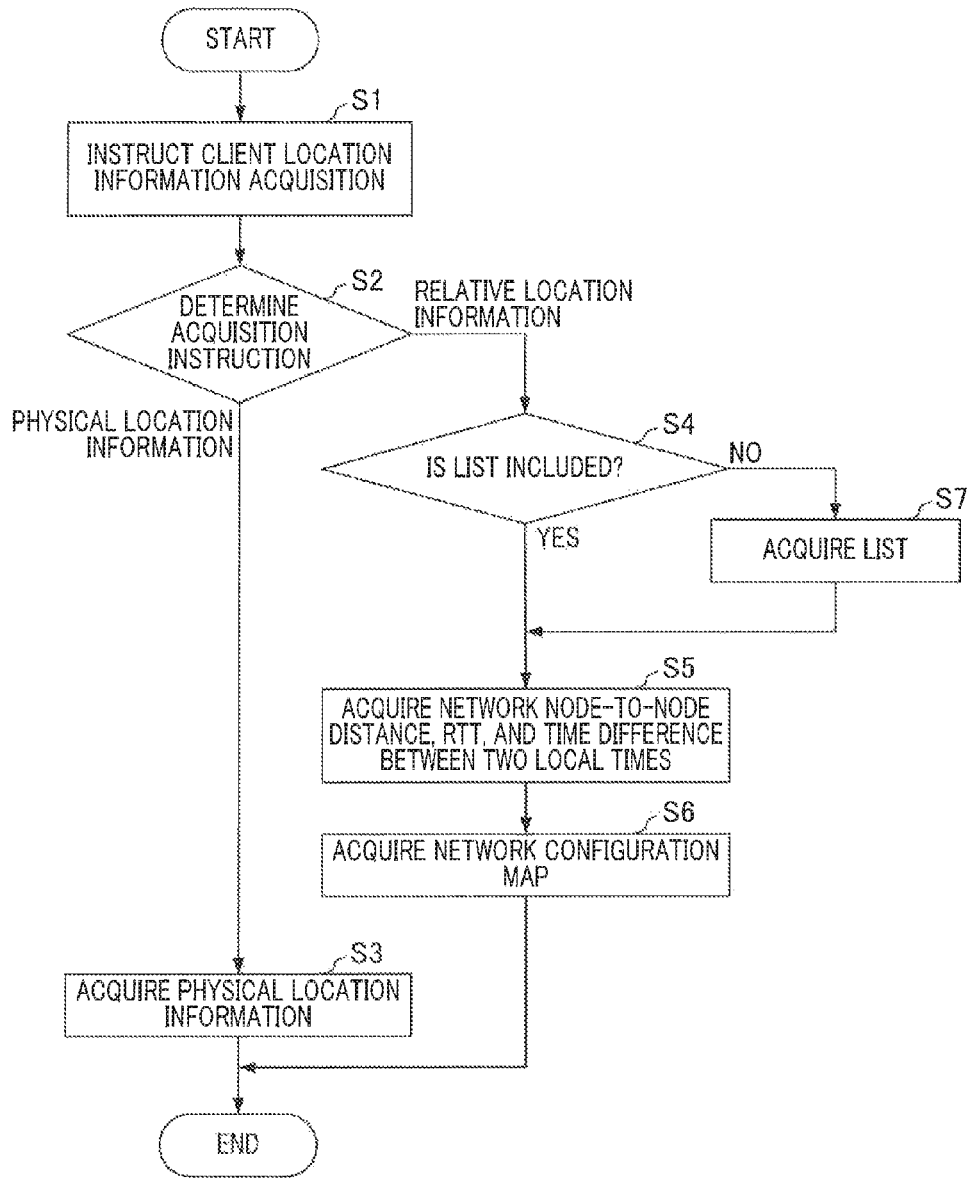
FIG. 7 is a flowchart illustrating an example of client location information acquisition processing.

FIG. 7 is a flowchart illustrating client location information acquisition processing. Firstly, the offload processing control unit 400 of the printer 101 instructs the client location information acquisition unit 408 to acquire client location information (step S1). In this example, the offload processing control unit 400 provides a physical location information acquisition instruction or a relative location information acquisition instruction to the client location information acquisition unit 408. When the printer 101 has received a relative location measuring server list from the virtual device management server 102 (see P12 shown in FIG. 6), a relative location information acquisition instruction includes the relative location measuring server list.

Next, client location information acquisition unit determines whether or not a client location information acquisition instruction in step S1 is either a physical location information acquisition instruction or a relative location information acquisition instruction (step S2). When the client location information acquisition instruction is the relative location information acquisition instruction, the process advances to step S4.

When the client location information acquisition instruction is the physical location information acquisition instruction, the client location information acquisition unit 408 acquires physical location information (step S3). In this example, the client location information acquisition unit 408 acquires GPS information about the printer 101, user setting location information, virtual PC location information, physical PC location information, an IP address, and network domain information as physical location information.

In step S4, it is determined whether or not the relative location information acquisition instruction includes the relative location measuring server list (step S4). When the relative location information acquisition instruction includes the relative location measuring server list, the process advances to step S5.

When the relative location information acquisition instruction does not include the relative location measuring server list, the client location information acquisition unit 408 makes a relative location measuring server list acquisition request to the virtual device management unit 503 of the virtual device management server 102. Then, the client location information acquisition unit 408 acquires the relative location measuring server list from the virtual device management unit 503 (step S7).

In steps S5 and S6, the client location information acquisition unit 408 acquires relative location information for the candidates of virtual device servers included in the relative location measuring server list. For example, the client location information acquisition unit 408 acquires a network node-to-node distance between the printer 101 and each of the candidates of virtual device servers, a communication delay time RTT, and the time difference between two local times (step S5). For example, the client location information acquisition unit 408 acquires a network configuration map (step S6).

More specifically, the client location information acquisition unit 408 creates a list of network configuration between its node and various services using a network search protocol such as LLDP (IEEE 802.1 AB), LLTD, or the like, where LLDP is an abbreviation for Link Layer Discovery Protocol and LLTD is an abbreviation for Link Layer Topology Discovery. The created list of network configuration includes, for example, the number of hops, router, switch, or the like.

The client location information acquisition unit 408 creates a network map as relative location information, and thus, is capable of acquiring not only the number of hops during communication between the printer 101 and the virtual device server but also a communication route and information about a switch(s) in the communication route. Thus, an accurate network path from the printer 101 to the virtual device server can be determined using the acquired relative location information. Consequently, an optimum virtual device server through which a Web service is provided can be selected.

Figure 8:
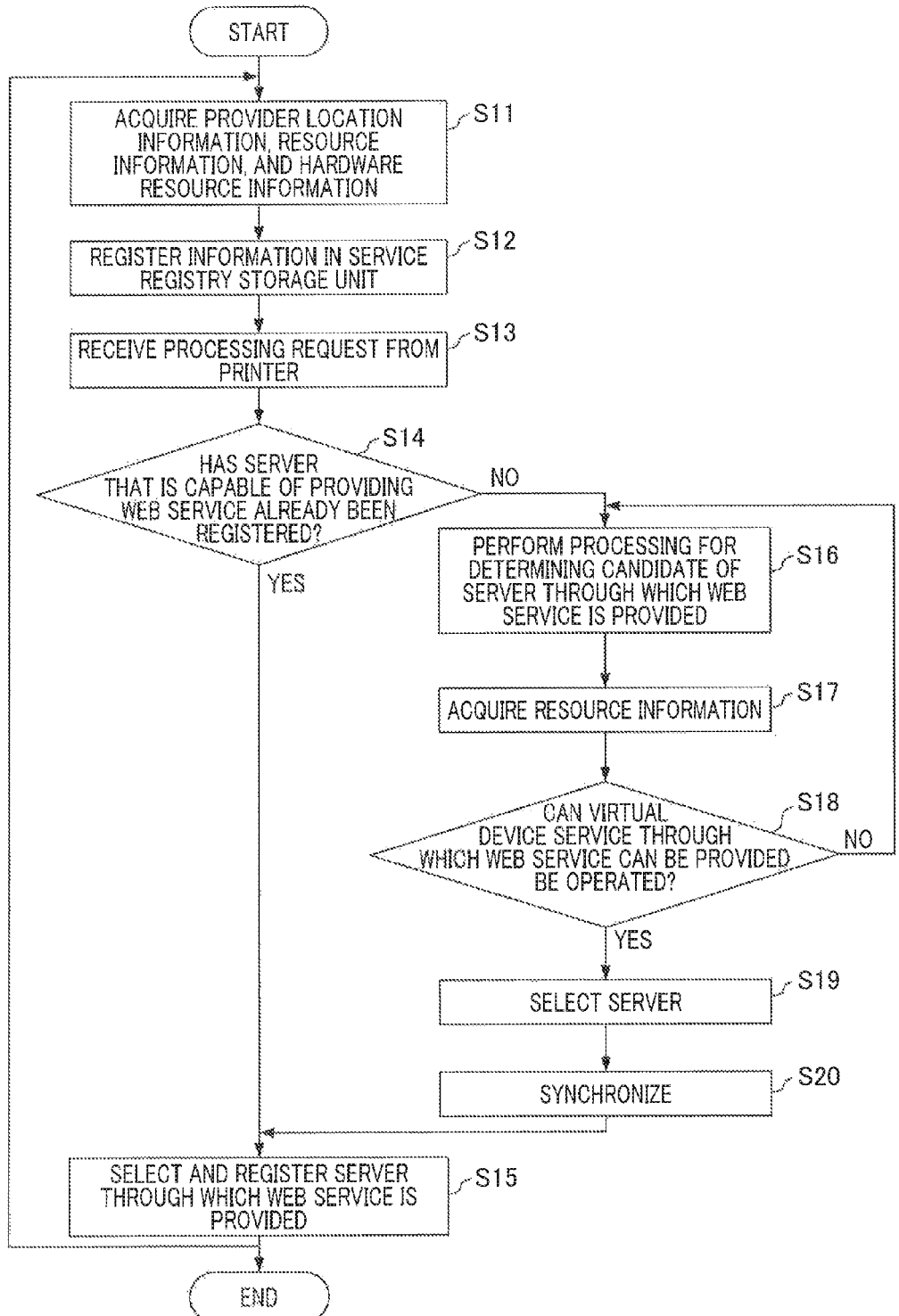
FIG. 8 is a flowchart illustrating an example of virtual device service registration processing.

FIG. 8 is a flowchart illustrating an example of virtual device service registration processing. Firstly, the virtual device management unit 503 of the virtual device management server 102 acquires provider location information, resource information, and hardware resource information from the virtual device control unit 514 of the virtual device server (step S11). The virtual device management unit 503 instructs the provider information management unit 504 to register information acquired in step S11 as a part of provider information in the service registry storage unit 505 (step S12).

Next, the virtual device management unit 503 receives a processing request from the printer 101 (step S13). In step S13, the virtual device management unit 503 further acquires client location information from the printer 101 (functions as a second acquisition unit). The client location information to be acquired in step S13 includes physical location information.

Next, the virtual device management unit 503 determines whether or not a virtual device service that is capable of providing a Web service in accordance with the processing request received in step S13 has been registered in provider information (step S14). When no virtual device service that is capable of providing the Web service has been registered, the process advances to step S16. When a virtual device service that is capable of providing the Web service has been registered, the virtual device management unit 503 selects and registers the virtual device service as the virtual device service through which the Web service is provided (step S15).

In step S16, the virtual device management unit 503 instructs the service provider determination unit 506 to execute processing for determining the candidates of virtual device servers through which a Web service is provided (step S16). More specifically, the service provider determination unit 506 determines the candidates of virtual device servers on the basis of provider location information included in provider information and client location information.

Next, the virtual device management unit 503 acquires resource information about the candidates of virtual device servers (step S17). Next, the virtual device management unit 503 executes the following processing on the basis of resource information acquired in step S17. The virtual device management unit 503 determines whether or not the candidates of virtual device servers are virtual device servers that are capable of running a virtual device service through which the Web service can be provided (step S18). In other words, the virtual device management unit 503 refers to resource information and determines whether or not the resources provided in the virtual device server, which has been determined as the candidate (selection target) by the process in step S16, satisfies a processing request.

When the candidates of virtual device servers are not virtual device servers that are capable of running a virtual device service through which the Web service can be provided, the process returns to step S16. When the candidates of virtual device servers are virtual device servers that are capable of running a virtual device service through which the Web service can be provided, the process advances to step S19.

In step S19, the virtual device management unit 503 selects a virtual device server that is capable of running a virtual device service through which the Web service can be provided as the virtual device server through which the Web service is provided. Then, the virtual device management unit 503 instructs the virtual device control unit 514 of the selected virtual device server to create a virtual device service through which the Web service is provided. Next, the service deploy unit 507 performs final synchronization of information between the virtual device service 515 and the printer 101 (step S20), and the process advances to step S15. With this arrangement, the virtual device service 515 transitions into an available state.

Through the process described with reference to FIG. 8, a server having the resource satisfying the processing request among the virtual device servers to be selected on the basis of a client location information can be selected as the server for providing a Web service corresponding to the processing request.

Figure 9:
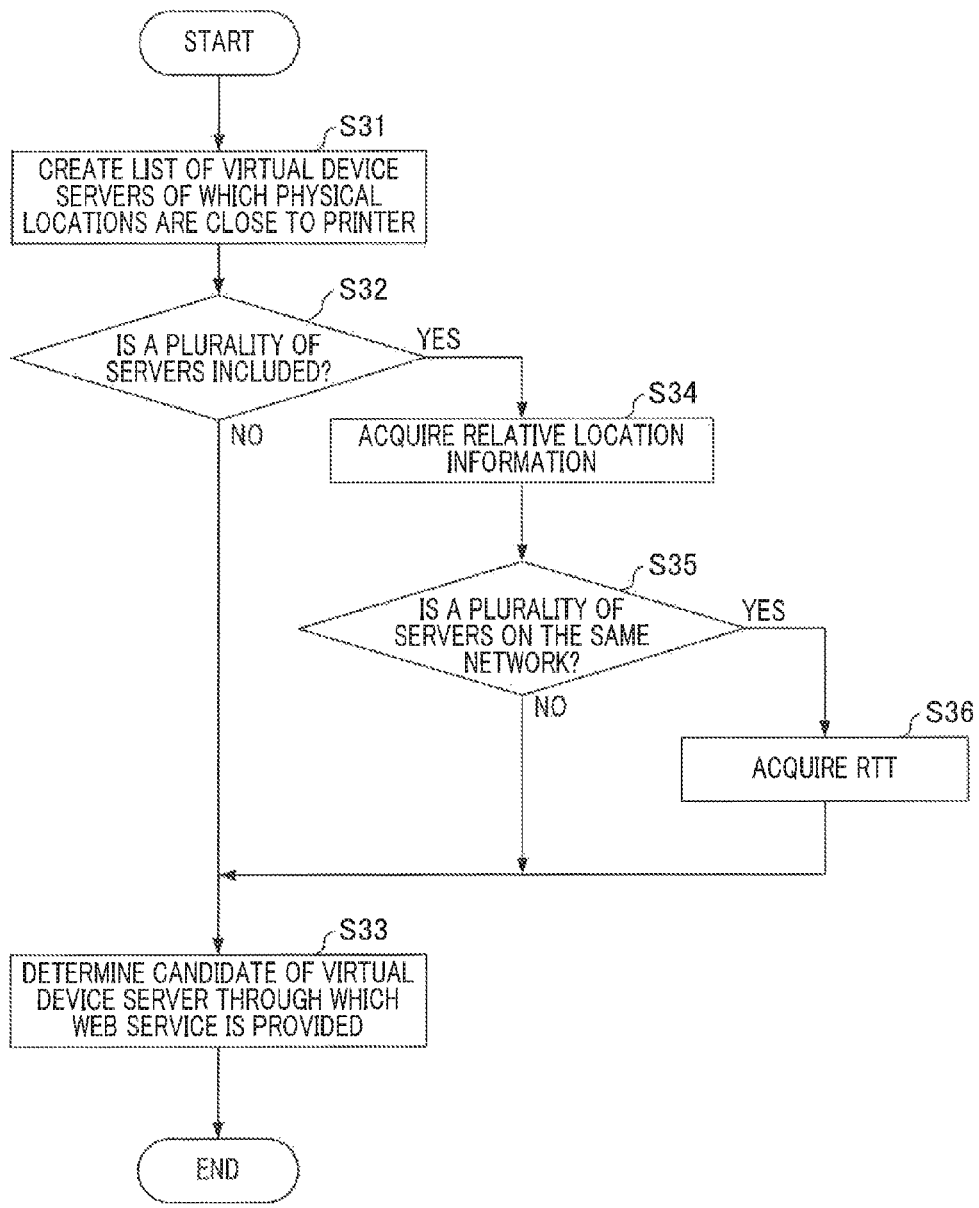
FIG. 9 is a flowchart illustrating am example of processing for determining the candidate of virtual device server through which a Web service is provided.

FIG. 9 is a flowchart illustrating an example of processing for determining the candidates of virtual device servers through which a Web service is provided in step S16 shown in FIG. 8. The service provider determination unit 506 refers to provider information, and acquires virtual device servers corresponding to the processing request from printer 102.

The service provider determination unit 506 creates a list of virtual device servers of which the physical locations are close to the printer 101 on the basis of location information about the acquired virtual device servers and physical location information about the printer 101 acquired from the printer 101 (step S31). For example, the service provider determination unit 506 specifies virtual device servers that are within a range of a predetermined distance from the printer 101 to thereby include the specified virtual device servers in the list.

Next, the service provider determination unit 506 determines whether or not the list created in step S31 includes a plurality of virtual device servers (step S32). When the list includes a plurality of virtual device servers, the process advances to step S34. When the list includes only one virtual device server, the virtual device server is the virtual device server that is arranged at a location closest to the printer 101. Thus, in this case, the process advances to step S33, and the service provider determination unit 506 determines the virtual device server that is arranged at a location closest to the printer 101 as the candidate of virtual device server through which a Web service is provided (step S33).

In step S34, the virtual device management unit 503 transmits the list created in step S31 as the relative location measuring server list to the printer 101. Then, the virtual device management unit 503 acquires relative location information about virtual device servers included in the relative location measuring server list from the printer 101.

Next, the service provider determination unit 506 determines whether or not a plurality of virtual device servers that are arranged on the same network as the printer 101 is included in the relative location measuring server list on the basis or a network configuration map included in relative location information (step S35).

When a plurality of virtual device servers that are arranged on the same network as the printer 101 is included in the relative location measuring server list, the process advances to step S36. When only one virtual device server that is arranged on the same network as the printer 101 is included in the relative location measuring server list, the process advances to step S33. Then, the service provider determination unit 506 determines the virtual device server that is arranged on the same network as the printer 101 as the candidate of virtual device server through which a Web service is provided.

In step S36, the service provider determination unit 506 acquires a communication delay time RTT included in the corresponding relative location information for each of a plurality of virtual device servers that is arranged on the same network as the printer 101 (step S36). Then, among the plurality of virtual device servers, the service provider determination unit 506 determines a virtual device server having the shortest communication delay time RTT as the candidate of virtual device server through which a Web service is provided (step S33).

It should be noted that the service provider determination unit 506 may also acquire a network node-to-node distance for the plurality of virtual device servers and determine a virtual device server having the shortest network node-to-node distance as the candidate of virtual device server through which a Web service is provided. Also, the service provider determination unit 506 may acquire the time difference between two local times for the plurality of virtual device servers, and determine a virtual device server having the shortest time difference between two local times as the candidate of virtual device server through which a Web service is provided.

In other words, when a virtual device server cannot be selected on the basis of the results of comparison between physical location information and virtual device server location information (Yes in step S32), the service provider determination unit 506 executes the following processing. The service provider determination unit 506 selects a virtual device server for providing a Web service corresponding to the processing request on the basis of relative location information.

Through the process described with reference to FIG. 9, it is assumed that the virtual device server 103 of which the physical location or the relative location is closest to the printer 101 located in Japan has been determined as a candidate. Here, when it has been determined by the process in step S18 shown in FIG. 8 that the virtual device server 103 located in Japan is not a virtual device server that is capable of running a virtual device service through which the Web service can be provided, the Web service is not deployed into the virtual device server 103. In this case, processing for determining the candidates of virtual device servers through which a Web service is provided is executed again (No in step S18 shown in FIG. 8, step S16). With this arrangement, for example, the virtual device server 104 located in U.S.A. is selected as a virtual device server through which a Web service is provided.

A further detailed description will be given of virtual device server selection processing performed by the Web service system of the present embodiment. For example, assume the case where the processing request received from the printer 101 to the virtual device management server 102 is a print service (Version 10.10) and the location of the printer 101 indicated by client location information is Japan.

The virtual device management server 102 refers to provider information (provider location information) shown in FIG. 5C, and executes the following processing. The virtual device management server 102 determines that a virtual device server (service) arranged at a location closest to the printer 101 is a virtual device server (service) corresponding to a Web service of which the Region is JP and the identifier is Print001. Since the Region of a virtual device server (service) corresponding to a Web service of which the identifier is Print003 is US, the virtual device management server 102 determines that the virtual device server is not arranged at a location near the printer 101.

When there is a plurality of Web services of which the Region is JP, the virtual device management server 102 executes, for example, the following processing The virtual device management server 102 determines a virtual device server (service) arranged at a location closest to the printer 101 using detailed physical location information such as the data center at which the virtual device service operates, the address where a virtual PC, a physical PC, or the like is located, the latitude or the longitude, or the like.

The virtual device management server 102 refers to resource information shown in FIG. 5D, and executes the following processing. The virtual device management server 102 determines that a virtual device server having the identifier "Print001" cannot receive a new Web service due to a high load on the basis of resource information about the virtual device server corresponding to a Web service of which the identifier is Print001. Thus, the virtual device management server 102 selects the virtual device server having the identifier "Print003" as the virtual device server for providing a print service in spite of the fact that the Region is US and mismatches the Region of the printer 101.

Figure 10:
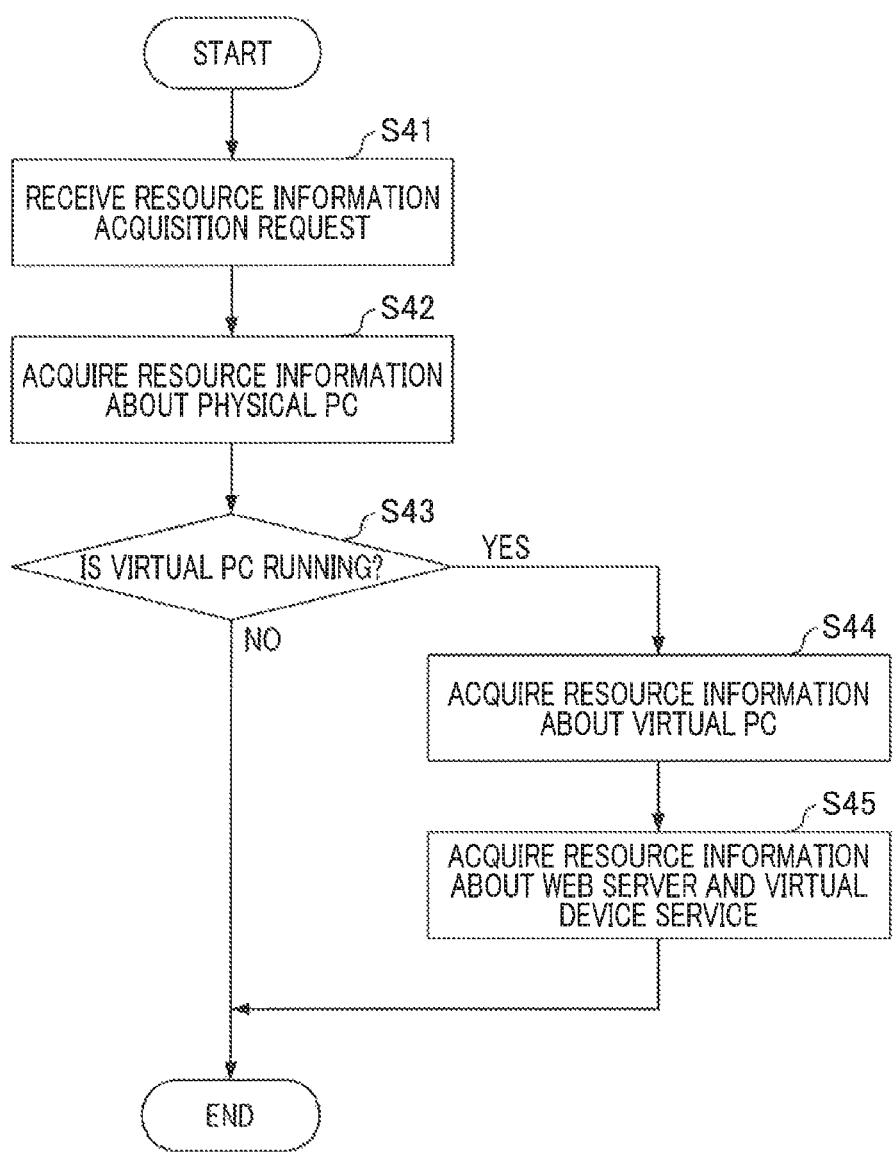
FIG. 10 is a flowchart illustrating resource information acquisition processing.

FIG. 10 is a flowchart illustrating resource information acquisition processing performed by a virtual device server. Firstly, the resource information acquisition unit 511 receives a virtual device server-resource information acquisition request from the virtual device control unit 514 (step S41). Next, the resource information acquisition unit 511 acquires resource information about a physical PC for implementing the virtual device server (step S42). The resource information acquisition unit 511 acquires, for example, the CPU usage rate of a physical PC, the usage rate of a Network card, the usage rate of a disk I/O, the transmission rate of a disk, the transfer amount of a network card, the transmission rate of a network, and the available space of a disk as resource information.

Next, the resource information acquisition unit 511 determines whether or not a virtual PC is running (step S43). When a virtual PC is not running, the process is ended. When a virtual PC is running, the resource information acquisition unit 511 acquires resource information about the virtual PC (step S44).

The resource information acquisition unit 511 acquires, for example, the CPU usage rate of a physical PC, the usage rate of a Network card, the usage rate of a disk I/O, the transmission rate of a disk, the transfer amount of a network card, the transmission rate of a network, and the available space of a disk as resource information. Resource information about a virtual PC can be acquired by utilizing information acquisition API that is specific to the virtual PC. For example, when a virtual PC is a Microsoft Hyper-V (registered trademark), resource information about the virtual PC can be acquired by utilizing the Hypervisor API. Next, the resource information acquisition unit 511 acquires resource information about the Web server 502 and the virtual device service 515 (step S45), and the process is ended.

When the virtual device management server 102 of the present embodiment receives a processing request from the image forming apparatus 101, the virtual device management server 102 selects a server for providing a Web service corresponding to the processing request and assigns the server to the image forming apparatus on the basis of provider information and client location information. For example, the virtual device management server 102 executes the following processing on the basis of virtual device server location information included in provider information and physical location information about the image forming apparatus 101 included in client location information. The virtual device management server 102 selects a virtual device server that is arranged at a location closest to the location of the image forming apparatus 101 as the virtual device server through which the Web service is provided. Thus, according to the virtual device management server 102 of the present embodiment, a Web service in accordance with the process requested by the image forming apparatus 101 can be provided to an appropriate server in accordance with the location of the image forming apparatus 101.

Also, the virtual device management server 102 of the present embodiment determines whether or not the resources provided in a virtual device server to be selected satisfy a processing request from the image forming apparatus 101. When the resources do not satisfy the processing request, the virtual device management server 102 selects a virtual device server having the resources satisfying the processing request as the virtual device server for providing a Web service corresponding to the processing request. Thus, according to the virtual device management server 102 of the present embodiment, a virtual device through which a Web service is provided can be switched in accordance with the fluctuations of the resources in a virtual device server.

The Web service system of the present embodiment may also be applied to a device consisting of integrated equipment including the case where a device is configured by a virtual OS or the like. Furthermore, the Web service system of the present embodiment may also be applied to a system configured by a cloud computing via Internet.

According to the Web service system of the present embodiment, a Web service in accordance with the process requested by an image forming apparatus can be provided to an appropriate server in accordance with the location of the image forming apparatus 101.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-032814 filed Feb. 18, 2011, which is hereby incorporated by reference herein in its entirety.

What is claimed is:

1. A Web service system comprising:
an image forming apparatus; and a server management apparatus that manages a plurality of virtual device servers for providing a Web service corresponding to processing requested by the image forming apparatus, the server management apparatus including a processor and a memory including instructions which, when executed by the processor, causes the server management apparatus to:

acquire location information about a virtual device server and resource information about a resource of the virtual device server from the plurality of virtual device servers and to manage the acquired information as server information;

receive a processing request from the image forming apparatus;

acquire physical location information indicating the physical location of the image forming apparatus;

acquire relative location information about the relative location of the image forming apparatus indicating a distance between the image forming apparatus and a virtual device server on a network;

determine whether or not a virtual device server for providing a Web service can be selected among the plurality of virtual device servers using the physical location information indicating the physical location of the image forming apparatus; and select a virtual device server from the plurality of virtual device servers for providing a Web service corresponding to the processing request on the basis of the managed server information, a processing request, the physical location information about the image forming apparatus, the relative location information about the image forming apparatus, and the result of the determination to thereby assign the selected virtual device server to the image forming apparatus, wherein, when it is determined that the virtual device server can be selected, a virtual device server arranged at a location closest to the physical location of the image forming apparatus is selected among the plurality of virtual device servers as a virtual device server for providing a Web service corresponding to the processing request on the basis of the physical location information and the location information of the plurality of virtual device servers, and wherein, when it is determined that the virtual device server cannot be selected, a virtual device server arranged at a location closest to the physical location of the image forming apparatus is selected among the plurality of virtual device servers as a virtual device server for providing a Web service corresponding to the processing request on the basis of the physical location information and the location information of the plurality of virtual device servers, or selects a virtual device server for providing a Web service corresponding to the processing request among the plurality of virtual device servers on the basis of the relative location information.

2. The Web service system according to claim 1, wherein the physical location information is any one of region information, locale information, a local time, GPS information, user setting location information, virtual PC location information, physical PC location information, an IP address, or network domain information about the image forming apparatus, and wherein the relative location information is any one of a network configuration map, a network node-to-node distance, a communication delay time RTT, or a time difference between two local times.

3. The Web service system according to claim 1, wherein the instructions further cause the server management apparatus to:

when selecting a virtual device server from among a plurality of virtual device servers, refer to the resource information to determine whether or not a resource provided in a virtual device server to be selected satisfies the processing request on the basis of the physical location information and the virtual device server location information of the virtual device server or the relative location information; and when the resource provided in the virtual device server to be selected does not satisfy the processing request, select a virtual device server having the resource satisfying the processing request as the virtual device server for providing a Web service corresponding to the processing request.

4. The Web service system according to claim 3, wherein the instructions further cause the server management apparatus to:

monitor a change in the state of resources of the plurality of virtual device servers;

specify a virtual device server having a resource satisfying the conditions for providing a Web service that is currently being provided depending on a monitoring result for a change in the state of the resource;

select a virtual device server for providing the Web service that is currently being provided on the basis of the results of comparison between the physical location information and the specified virtual device server location information or the relative location information; and switch a virtual device server for providing the Web service from the server that is currently providing the Web service to the selected virtual device server.

5. A server management apparatus that manages a plurality of virtual device servers for providing a Web service corresponding to processing requested by an image forming apparatus, the server management apparatus including a processor and a memory including instructions which, when executed by the processor, cause the server management apparatus to:

acquire location information about a virtual device server and resource information about the resource of the virtual device server from the plurality of virtual device servers and to manage the acquired information as server information;

receive a processing request from the image forming apparatus;

acquire physical location information indicating the physical location of the image forming apparatus;

acquire relative location information about the relative location of the image forming apparatus indicating a distance between the image forming apparatus and a virtual device server on a network;

determine whether or not a virtual device server for providing a Web service can be selected among the plurality of virtual device servers using the physical location information indicating the physical location of the image forming apparatus; and select a virtual device server from the plurality of virtual device servers for providing a Web service corresponding to the processing request on the basis of server information, a processing request, the physical location information about the image forming apparatus, the relative location information about the image forming apparatus, and the result of the determination to thereby assign the selected virtual device server to the image forming apparatus, wherein, when it is determined that the virtual device server can be selected, a virtual device server arranged at a location closest to the physical location of the image forming apparatus is selected among the plurality of virtual device servers as a virtual device server for providing a Web service corresponding to the processing request on the basis of the physical location information and the location information of the plurality of virtual device servers, and wherein, when it is determined that the virtual device server cannot be selected, a virtual device server arranged at a location closest to the physical location of the image forming apparatus is selected among the plurality of virtual device servers as a virtual device server for providing a Web service corresponding to the processing request on the basis of the physical location information and the location information of the plurality of virtual device servers, or selects a virtual device server for providing a Web service corresponding to the processing request among the plurality of virtual device servers on the basis of the relative location information.

6. A method for providing a Web service in a system comprising an image forming apparatus and a server management apparatus that manages a plurality of virtual device servers for providing a Web service corresponding to processing requested by the image forming apparatus, the method comprising:

acquiring, in the server management apparatus, location information about a virtual device server and resource information about the resource of the virtual device server from the plurality of virtual device servers and managing the acquired information as virtual device server information;

receiving, in the server management apparatus, a processing request from the image forming apparatus;

acquiring, in the server management apparatus, physical location information indicating the physical location of the image forming apparatus;

acquiring relative location information about the relative location of the image forming apparatus indicating a distance between the image forming apparatus and a virtual device server on a network;

determining, in the server management apparatus, whether or not a virtual device server for providing a Web service can be selected among the plurality of virtual device servers using the physical location information indicating the physical location of the image forming apparatus; and selecting, in the server management apparatus, a virtual device server from the plurality of virtual device servers for providing a Web service corresponding to the processing request on the basis of the server information, the processing request, the physical location information about the image forming apparatus, and the relative location information about the image forming apparatus to thereby assign the selected virtual device server to the image forming apparatus, wherein, when it is determined that the virtual device server can be selected, the server management apparatus selects a virtual device server arranged at a location closest to the physical location of the image forming apparatus among the plurality of virtual device servers as a virtual device server for providing a Web service corresponding to the processing request on the basis of the physical location information and the location information of the plurality of virtual device servers, and wherein, when it is determined that the virtual device server cannot be selected, the server management apparatus selects a virtual device server arranged at a location closest to the physical location of the image forming apparatus among the plurality of virtual device servers as a virtual device server for providing a Web service corresponding to the processing request on the basis of the physical location information acquired by the server management apparatus and the location information of the plurality of virtual device servers, or selects a virtual device server for providing a Web service corresponding to the processing request among the plurality of virtual device servers on the basis of the relative location information.

7. A non-transitory computer readable storage medium on which is stored a computer program for making a computer execute a method for providing a Web service in a system comprising an image forming apparatus and a server management apparatus that manages a plurality of virtual device servers for providing a Web service corresponding to processing requested by the image forming apparatus, the method comprising:

acquiring, in the server management apparatus, location information about a virtual device server and resource information about the resource of the virtual device server from the plurality of virtual device servers and managing the acquired information as virtual device server information;

receiving, in the server management apparatus, a processing request from the image forming apparatus;

acquiring, in the server management apparatus, physical location information indicating the physical location of the image forming apparatus;

acquiring relative location information about the relative location indicating a distance between the image forming apparatus and a virtual device server on a network;

determining, in the server management apparatus, whether or not a virtual device server for providing a Web service can be selected among the plurality of virtual device servers using the physical location information indicating the physical location of the image forming apparatus; and selecting, in the server management apparatus, a server from the plurality of virtual device servers for providing a Web service corresponding to the processing request on the basis of the virtual device server information, the processing request, the physical location information about the image forming apparatus, and the relative location information about the image forming apparatus to thereby assign the selected virtual device server to the image forming apparatus, wherein, when it is determined that the virtual device server can be selected, the server management apparatus selects a virtual device server arranged at a location closest to the physical location of the image forming apparatus among the plurality of virtual device servers as a virtual device server for providing a Web service corresponding to the processing request on the basis of the physical location information and the location information of the plurality of virtual device servers, and wherein, when it is determined that the virtual device server cannot be selected, the server management apparatus selects a virtual device server arranged at a location closest to the physical location of the image forming apparatus among the plurality of virtual device servers as a virtual device server for providing a Web service corresponding to the processing request on the basis of the physical location information acquired by the server management apparatus and the location information of the plurality of virtual device servers, or selects a virtual device server for providing a Web service corresponding to the processing request among the plurality of virtual device servers on the basis of the relative location information.

* * * * *